United States Patent
Saito

(10) Patent No.: US 9,682,701 B2
(45) Date of Patent: Jun. 20, 2017

(54) FUEL CELL SYSTEM, FUEL CELL VEHICLE, AND METHOD FOR EVALUATING OPERATIONAL FAILURE OF ON-OFF VALVE

(71) Applicant: TOYOTA JIDOSHA KABUSHIKI KAISHA, Toyota-shi, Aichi-ken (JP)

(72) Inventor: Hiromu Saito, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/886,346

(22) Filed: Oct. 19, 2015

(65) Prior Publication Data

US 2016/0114793 A1 Apr. 28, 2016

(30) Foreign Application Priority Data

Oct. 24, 2014 (JP) .................................. 2014-217126

(51) Int. Cl.
*B60W 20/50* (2016.01)
*H01M 8/04223* (2016.01)
*B60L 11/18* (2006.01)

(52) U.S. Cl.
CPC .......... *B60W 20/50* (2013.01); *B60L 11/1809* (2013.01); *B60L 11/1881* (2013.01); *B60W 2510/28* (2013.01); *B60W 2710/28* (2013.01); *Y02T 10/7005* (2013.01)

(58) Field of Classification Search
CPC ............. B60W 20/50; H01M 8/04223; H01M 8/04179; H01M 8/0491; F02D 41/0072; B60L 11/1887

USPC .................. 701/22; 429/429, 444, 413, 431; 60/605.2; 320/101
See application file for complete search history.

(56) References Cited

U.S. PATENT DOCUMENTS

| 2005/0249989 A1* | 11/2005 | Pearson | H01M 8/0491 429/431 |
| 2008/0131741 A1* | 6/2008 | Tabuchi | H01M 8/04179 429/413 |
| 2009/0243536 A1* | 10/2009 | Whitehouse | B60L 11/1887 320/101 |
| 2013/0149627 A1* | 6/2013 | Nishimura | H01M 8/04223 429/444 |

(Continued)

FOREIGN PATENT DOCUMENTS

DE 10 2012 005 692 A1 9/2013
JP 2002-151126 A 5/2002

(Continued)

*Primary Examiner* — Yuri Kan
(74) *Attorney, Agent, or Firm* — Finnegan, Henderson, Farabow, Garrett & Dunner, LLP

(57) ABSTRACT

The control unit of the fuel cell system monitors the status of power generation of the fuel cell and calculates a total amount of the fuel gas consumption, based on the amount of power generated by the fuel cell, from a point in time when the supply gas pressure reaches a standard gas pressure. Another total amount of the fuel gas consumption is calculated based on a gas pressure change that corresponds to a decrease of the gas pressure from the standard gas pressure. Comparing two total amounts of the fuel gas consumptions, the evaluation is performed as whether the on-off valve in the fuel gas flow path from each of the fuel gas tanks to the fuel cell fails to be opened.

12 Claims, 4 Drawing Sheets

(56) References Cited

U.S. PATENT DOCUMENTS

| | | | |
|---|---|---|---|
| 2014/0242487 A1* | 8/2014 | Nishimura | H01M 8/04223 429/429 |
| 2015/0089942 A1* | 4/2015 | Kihara | F02D 41/0072 60/605.2 |
| 2015/0134277 A1 | 5/2015 | Van Doorn | |

FOREIGN PATENT DOCUMENTS

| | | |
|---|---|---|
| JP | 2003-308865 A | 10/2003 |
| JP | 2005-123093 A | 5/2005 |
| JP | 2005-310550 | 11/2005 |
| JP | 2006-108024 | 4/2006 |
| JP | 2006-185866 A | 7/2006 |

* cited by examiner

FUEL CELL SYSTEM, FUEL CELL VEHICLE, AND METHOD FOR EVALUATING OPERATIONAL FAILURE OF ON-OFF VALVE

CROSS-REFERENCE TO RELATED APPLICATION

The present application claims priority from Japanese application P2014-217126 filed on Oct. 24, 2014, the content of which is hereby incorporated by reference into this application.

BACKGROUND

Field

The present invention relates to a fuel cell system, a fuel cell vehicle, and a method for evaluating an operational failure of an on-off valve equipped in the fuel cell system.

Related Art

In supplying hydrogen gas stored in a fuel tank to a fuel cell, the fuel cell system reduces the gas pressure to a predetermined supply pressure using a pressure control valve. For such decompression adjustment, there has been known a mouthpiece of a fuel gas tank having a pressure control valve and a pressure sensor built therein in addition to an on-off valve. Assuming such a structure, it is proposed to use the gas pressure detected by the pressure sensor at the tank mouthpiece for evaluating an operational failure of the pressure control valve or the on-off valve (see JP-2006-108024A, for example).

Since the evaluation method proposed in the patent literature referred to above assumes a single fuel tank, a similar evaluation method could not be applied to a configuration of multiple fuel gas tanks. This is because, if an operation is carried out where the fuel gas is supplied from multiple fuel gas tanks at the same time, the following problem is likely to occur: Assuming that all the outlet sides of the on-off valves in the multiple fuel gas tanks are converged co connect to the pressure control valve via a fuel supply pipe provided with a pressure sensor, it is hard to detect an opening failure of the on-off valve from sense cause at the tank mouthpiece of the fuel gas tank. This is because the fuel cell is supplied with fuel gas via a fuel supply pipe and the supplied gas pressure on time tank side upstream from the pressure control valve in the fuel supply pipe is sensed by the pressure sensor despite the fact that no fuel gas is supplied from the fuel gas tank with the faulty on-off valve at the tank mouthpiece. Then, the failure of the on-off valve, whether it be an opening failure or a shutting failure, cannot be judged simply by the supplied gas pressure on the tank side upstream from the pressure control valve in the fuel supply pipe, which lowers the reliability of the evaluation of a valve opening failure. For that reason, an evaluation method capable of preventing deterioration of reliability in evaluating the failure of on-off valves that open and shut the gas flow path from the fuel gas tank has been called in.

SUMMARY

In order to solve at least part of the problem described above, the present invention can be implemented in the following aspects:

(1) According to one aspect of the present invention, a fuel cell system is provided. This fuel, cell system may comprise a fuel cell that generates power by receiving fuel gas; a plurality of fuel gas tanks connected in parallel to the fuel cell; an on-off valve provided in a fuel gas flow path from each of the fuel gas tanks, wherein the on-off valve is switched between two positions to discharge fuel gas from the gas fuel tank to the fuel cell and shut fuel gas off; a supply gas pressure sensor that detects supply gas pressure in sight of the fuel gas tank when fuel gas from the plurality of fuel gas tanks is simultaneously supplied to the fuel cell; a first consumption calculation unit that monitors a power generation status of the fuel cell and calculates a total amount of a fuel gas consumption from a point in time when the supply gas pressure detected by the supply gas pressure sensor reaches a standard gas pressure predetermined, based on an amount of power generated by the fuel cell; a second consumption calculation unit that calculates a total amount of a fuel gas consumption based on a gas pressure change that corresponds to a decrease of the gas pressure detected by the supply gas pressure sensor from the standard gas pressure; and a valve operation evaluation unit that evaluates whether the on-off valve in each of the fuel gas tanks fails to be opened by comparing total amounts of the fuel gas consumptions calculated by the first and second consumption calculation units with each other.

The fuel cell system of the aspect described above uses two amounts of fuel gas consumption from the point in time of the standard gas pressure in evaluating any opening failure of the on-off valve. These two total amounts are the total amount of fuel gas consumption calculated by the first gas consumption calculation unit based on the amount of power generated by the fuel cell (hereinafter called "the first total gas consumption) and the total amount of fuel gas consumption calculated by the second gas consumption calculation unit based on the pressure change from the standard gas pressure at the time thereof to the supply gas pressure in sight of the tank detected by the supply gas pressure sensor (hereinafter called "the second total gas consumption).

The first total gas consumption is a calculated value based on the amount of power generated by the fuel cell. Therefore, the first total gas consumption can be determined regardless of whether the fuel gas is supplied from all or part of the plurality of the fuel gas tanks.

Meanwhile, as the supply of gas from the fuel gas tank to the fuel cell proceeds, the amount of stored gas and the gas pressure drop down in each of the fuel gas tanks. Under this condition, the relation between the amount of fuel gas supplied to the fuel cell and the supply gas pressure in sight of the tank detected by the supply gas pressure sensor follows the equation of the gas state, and therefore, depends on the temperature and volume of the fuel gas. The amount of the fuel gas consumption calculated from the change in the supply gas pressure detected by the supply gas pressure sensor can be obtained as the second total gas consumption. This total second gas consumption is no different from the first total gas consumption based on the amount of power generated by the fuel cell unless there is an opening failure of any on-off valve in the fuel gas flow path from the plurality of fuel gas tanks. Therefore, the second total gas consumption calculated based on the pressure change or decrease from the standard gas pressure equals to the first total gas consumption. Even if the first and second total gas consumptions do not match, the difference would be limited to the range of detection error allowed for the supply gas pressure sensor or the range of leak allowed in the gas supply path.

On the contrary, the pressure changes in case of having an opening failure of the on-off valve in the fuel gas flow path from any fuel gas tank are as follows: In the initial stage when fuel gas supply from the plurality of fuel gas tanks at the same time is started, the fuel gas is supplied at the standard gas pressure from other fuel gas tanks having an on-off valve with no opening failure. Therefore, the initial gas supply pressure has no difference between the cases of having an opening failure of the on-off valve or no failure. However, as the gas supply proceeds, the amount of gas supplied from the fuel gas tank with an on-off valve with no opening failure is increased by the amount of stopped or decreased gas supply from the fuel gas tank having a faulty on-off valve, and the amount of gas remaining in the fuel tank having an on-off valve with no opening failure and the gas pressure therein rapidly drop down as compared to the case of no faulty valve. For this reason, comparing the second total gas consumption to the first total gas consumption when the fuel gas consumption has proceeded to some extent, they turned out to be quite different from the case where the on-off valve has no opening failure. As a result, according to the fuel cell system of the aspect described above, any opening failure of the on-off valve can be detected with a high reliability by comparing the first total gas consumption with the second total gas consumption. In doing that, a judgment can be made that at least one of the on-off valves has an opening failure, or another judgment can be made that no on-off valve has any opening failure. Of course, both judgments can be made at once. In either case, deterioration of judgment reliability can be prevented.

(2) In the fuel cell system of this aspect described above, the valve operation evaluation unit may determine a gas consumption differential, which is an absolute value of a difference between the total amounts of the fuel gas consumptions calculated by the first and second consumption calculation units respectively, and in case where the gas consumption differential is less than a predetermined threshold value, the valve operation evaluation unit evaluates that the on-off valve does not fail to be opened. According to this aspect, it is easy to make evaluation judgments.

(3) In the fuel cell system of the aspect described above, the point in time of the standard gas pressure predetermined is when each of the plurality of the fuel gas tanks has been filled up, and the standard gas pressure predetermined is a gas pressure when the fuel gas tanks has been filled up. This way, it is made possible to make evaluation judgments that there is any or no opening failure of the on-off valve after filling each of the fuel gas tanks up to the gas filling pressure with enough reliability.

(3) In either aspect of the fuel cell system described above, the valve operation evaluation unit does not evaluate whether the on-off valve fails to be opened by comparing the total amounts of the fuel gas consumptions, under a situation where at least one of the total amounts of the fuel gas consumptions calculated by the first and second consumption calculation units has not reached a predetermined gas consumption amount. This has the following advantages: if there is any opening failure of the on-off valve in the fuel gas flow path from any fuel gas tank, the supply gas pressure in sight of the tank detected by the supply gas pressure sensor is reduced early from the standard gas pressure by the amount of stopped or decreased gas supply as described above, and the extent of such reduction gets larger as the gas supply continues. Then, under a situation where the amount of fuel gas consumption has not reached the predetermined gas consumption amount, the gas supply pressure in sight of the gas tank may be decreasing, although the extent of decrease can be within the tolerance of the sensor and the like so that the gas consumption differential between the first and second total gas consumptions can be limited within a predetermined threshold. On the contrary, since the degree of decrease in the gas supply pressure in sight of the gas tank gets larger once the amount of fuel gas consumption reaches the predetermined gas consumption amount, it is more likely to happen that, if there is any opening failure of the on-off valve, the gas consumption differential between the first and second total gas consumptions grows too large to be limited within the predetermined threshold. As a result, according to the fuel cell system of this aspect, evaluation of any valve opening operation is made only after the calculated total gas consumption reaches the predetermined gas consumption, which enables to avoid such an inadvertent judgment as to say there is no valve opening failure despite the fact that such failure exists, thereby preventing deterioration of judgment reliability in a highly effective manner.

(5) According to another aspect of the present invention, a vehicle with a fuel cell is provided. This vehicle may comprise a fuel cell system in accordance with anyone of claims 1 to 4; and a battery that is charged by electric power generated in the fuel cell. According to the vehicle of this aspect, deterioration of reliability in evaluating any opening failure of the on-off valve can be prevented in running the vehicle with the power generated by the fuel cell.

(6) According to still another aspect of the present invention, a method for evaluating an operational failure of an on-off valve provided in a fuel gas flow path from a plurality of fuel gas tanks to a fuel cell in a fuel cell system is provided. The method comprises detecting a supply gas pressure of fuel gas that is simultaneously supplied to the fuel cell from the plurality of fuel gas tanks connected in parallel to the fuel cell; monitoring a power generation status of the fuel cell and calculating a first total gas consumption from a point in time when the detected supply gas pressure reaches a standard gas pressure predetermined, based on an amount of power generated by the fuel cell; calculating a second total gas consumption based on a gas pressure change that corresponds to a decrease of the detected supply gas pressure from the standard gas pressure; and evaluating whether the on-off valve fails to be opened by comparing the first and second total gas consumptions.

According to the valve operation evaluation process for the on-off valve described above, it is made possible to make a judgment with enough reliability that there is any or no opening failure of the on-off valve after filling each of the fuel gas tanks up to the filling pressure.

The present invention may be implemented in various aspects and may be applied, for example, to a fuel gas supply device that supplies fuel gas to the fuel cell, a fuel gas supply method, or a power generation system for obtaining power by means of supplying fuel gas from a fuel gas tank to the fuel cell.

BRIEF DESCRIPTION OF THE DRAWINGS

The present disclosure is illustrated by way of example and not by way of limitation in the figures of the accompanying drawings, in which the like reference numerals indicate like elements and in which.

DESCRIPTION OF THE EMBODIMENTS

Figure 1:
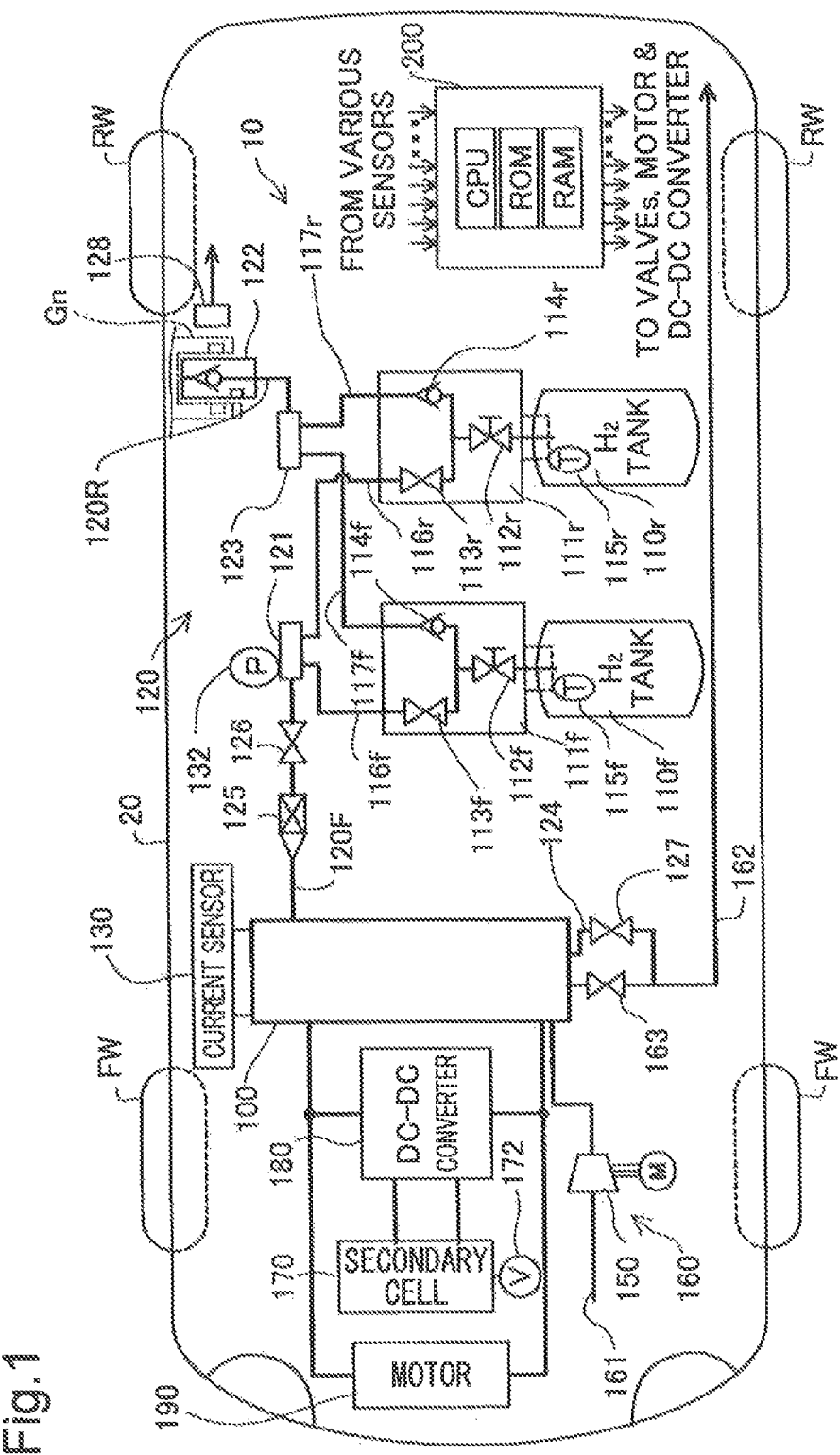
FIG. 1 is an illustrative drawing schematically showing a fuel cell system 10 as a first embodiment of the present invention.

Embodiments of the present invention are described below in reference to the drawings. FIG. 1 is an illustrative drawing schematically showing a fuel cell system 10 as a first embodiment of the present invention.

As shown in the drawing, the fuel cell system 10 is mounted on a fuel cell vehicle 20 and comprises a fuel cell 100, a hydrogen gas supply system 120 including two gas tanks, an air supply system 160 including a motorized compressor 150, a cooling system, not shown, a secondary cell 170, a DC-DC converter 180, and a control unit 200. The fuel cell 100 is configured by layering multiple power generation modules equipped with a membrane electrode assembly (MEA), not shown, and is installed under the vehicle floor between the forward wheels FW and rear wheels RW. The fuel cell 100 generates power by electrically reacting hydrogen contained in the hydrogen gas supplied from the hydrogen gas supply system 120 described later and oxygen contained in the air supplied from the air supply system 160, and drives the loads such as a driving motor 190 for the front and rear wheels using the generated power. The power-generation status of the fuel cell 100 is always measured by a current sensor 130, which outputs the measurement results to a control unit 200 described later.

The hydrogen gas supply system 120 comprises two hydrogen gas tanks 110$f$, 110$r$ that store high pressure hydrogen gas as fuel gas to be supplied to fuel cell 100, a fuel gas supply pipeline 120F reaching the fuel cell 100, a supply-side manifold 121 at the end of the gas flow path, a hydrogen filling pipeline 120R extending from a receptacle 122 to a filling-side manifold 123, and a discharge pipeline 124 that discharges unconsumed hydrogen gas (anode off-gas) to the atmosphere. Other than these, the hydrogen gas supply system 120 includes an injector 125 provided in the fuel gas supply pipeline 120F, a decompression valve 126, a supply gas pressure sensor 132, and even a discharge flow control valve 127 provided in the discharge pipeline 124. The supply of hydrogen gas to the fuel cell 100 by the hydrogen gas supply system 120 is performed by using the hydrogen gas tanks 110$f$, 110$r$ as sources of supply via the supply gas pressure sensor 132, decompression valve 126 and injector 125. The decompression vale 126 operates upon receipt of signals from the control unit 200 described later, and supplies post-decompression hydrogen gas to the injector 125. The injector 125 operates upon receipt of signals from the control unit 200 described later, and supplies hydrogen gas jet to the fuel cell 100 after controlling the flow of hydrogen gas. The supply gas pressure sensor 132 is provided in supply-side tank pipelines 116$f$, 116$r$ that converge at the supply-side manifold 121 on the immediate downstream side of one convergence. Therefore, the supply gas pressure sensor 132 detects the pressure on the upstream side of the decompression valve 126 in the fuel gas supply pipeline 120F, that is, the pressure of hydrogen gas supplied to the fuel cell 100 from the hydrogen gas tanks 110$f$, 110$r$. The handling of data on the hydrogen gas pressure detected by the supply gas pressure sensor 132 is described later in detail.

The hydrogen gas tanks 110$f$ and 110$r$ are resin-made tanks with a fiber-reinforced layer made by winding a fiber around the outer periphery of a resin-made liner and are connected in parallel to the fuel cell 100. The hydrogen gas tanks 110$f$ and 110$r$ are mounted on the fuel cell vehicle 20 laid down in the vehicular lateral direction in such a way that the hydrogen gas tank 110$f$ comes in front of the hydrogen gas tank 110$r$ in the vehicular longitudinal direction. These hydrogen gas tanks 110$f$, 110$r$ are supplied and filled with high-pressure hydrogen gas at a hydrogen gas station, not shown, and each stores a given amount of hydrogen gas. Also, the hydrogen gas tanks 110$f$, 110$r$ are provided with mouthpieces 111$f$, 111$r$, respectively, which are provided with main valves 112$f$, 112$r$, on-off valves 113$f$, 113$r$, check valves 114$f$, 114$r$, temperature sensors 115$f$, 115$r$ that detect temperature in each tank, respectively. One connection side of the main valves 112$f$, 112$r$ is connected to the hydrogen gas tank 110$f$ and 110$r$, respectively, and the other connection side of the main valves 112$f$, 112$r$ is each forked to connect to the on-off valves 113$f$, 113$r$ as well as check valves 114$f$, 114$r$, respectively. The check valves 114$f$, 114$r$ are each connected to the filling-side manifold 123 at filling-side tank pipelines 117$f$, 117$r$, respectively, to control the gas to pass only from the filling-side manifold 123 toward the hydrogen gas tanks 110$f$, 110$r$.

The main valves 112$f$, 112$r$ are usually operated manually in the direction of opening the flow path and keep the flow path open for supplying and discharging hydrogen gas to and from the hydrogen gas tanks 110$f$, 110$r$. The on-off valves 113$f$, 113$r$ are provided in the supply-side tank pipelines 116$f$, 116$r$ extending from the hydrogen gas tanks 110$f$, 110$r$ to the supply-side manifold 121. The on-off valves 113$f$, 113$r$ are opened and closed under the control of the control unit 200, described later, to discharge gas in the tank to the fuel cell 100 or shut off the flow in the supply-side tank pipelines 116$f$, 116$r$. By such pipeline configuration, the hydrogen gas tanks 110$f$, 110$r$ are connected to the fuel cell 100 via the supply-side tank pipelines 116$f$, 116$r$ that fork out of the supply-side manifold 121 of the fuel gas supply pipeline 120F and connect in parallel to the fuel cell 100. In this case, each of these tank pipelines on the supply side and filling side is made attachable and detachable on the side of the supply-side manifold 121, filling-side manifold 123 or the tank mouthpieces 111$f$, 111$r$ at the time of replacing the tank.

The temperature sensors 115$f$, 115$r$ are provided with a connector attachable and detachable at the time of replacing the tank, and after the installation, are connected to the control unit, described later, by a connector and a signal line, not shown, to output the detected tank temperature to the control unit 200. The on-off valves 113$f$, 113$r$ are also connected to the control unit 200, described later, by a connector and a signal line, not shown, to perform open-shut operations under the control of the control unit 200. In the following descriptions, the on-off valves 113$f$, 113$r$ are collectively called the on-off valve 113 for the convenience sake, and if needed to be named separately for each tank, these valves are distinguished between the on-off valve 113$f$ and on-off valve 113$r$. The same holds true for the hydrogen gas tanks 110$f$, 110$r$ and they are collectively called the hydrogen gas tank 110, and if needed to be named separately for each tank, these tanks are distinguished between the hydrogen gas tank 110$f$ and hydrogen gas tank 110$r$.

The hydrogen gas supply system 120 provided with the pipeline configuration described above supplies hydrogen gas from both hydrogen gas tanks 110$f$ and 110$r$ to the fuel cell 100 at the same time under a control by the control unit 200. The hydrogen gas supply system 120 supplies hydrogen gas supplied from the tanks to the anode of the fuel cell 100 via the processes of flow control at the injector 125 and decompression (pressure adjustment) at the decompression valve 126. Meanwhile, the anode off-gas used for power generation in the fuel cell 100 is controlled its flow rate by the discharge flow control valve 127 of the discharge pipeline 124 to be discharged to the atmosphere via a discharge pipeline 162, described later. The injector 125 is adjustable from zero gas flow, and if the flow is set at zero, the fuel gas supply pipeline 120F is in a closed state. In the present embodiment, the amount of hydrogen gas supplied to the fuel cell 100 is controlled by this injector 125, but the injector 125 may be used only for supplying hydrogen gas jet by providing a flow control valve that controls the amount of hydrogen gas supplied to the fuel cell 100 on the upstream side of the injector 125.

The receptacle 122 of the hydrogen gas supply system 120 is located at a gas filling inlet that is equivalent to the fuel filling opening on the side or rear of the conventional gasoline-powered vehicle and is covered by the exterior thereof. The receptacle 122 is provided with a nozzle sensor 128 that detects installation of a gas filling nozzle Gn. In the process of filling hydrogen gas at a hydrogen gas station, not shown, the receptacle 122 is installed with the gas filling nozzle Gn and hydrogen gas supplied at high pressure is introduced to the filling-side manifold 123. The supplied high pressure hydrogen gas is introduced to the hydrogen gas tanks 110f, 110r to be filled therein via the filling side pipelines 117f, 117r and the check valves 114f, 114r. In the process of such gas filling, the temperature sensors 115f, 115r provided in the hydrogen gas tanks 110f, 110r, respectively, output a signal reflecting the temperature in each tank to the control unit 200 and an in-station control unit. The signal reflecting temperature in each tank is used for checking and detecting the amount of filled gas and the filling pressure. Also, the condition of connection between the receptacle 122 and the gas filling nozzle Gn is detected by the nozzle sensor 128, and the control unit 200 that receives the detected signals makes a judgment on the status of filling such as "gas filling in progress" or "gas filling complete" based on the signals.

Next, the air supply system 160 that supplies oxygen to the cathode of the fuel cell 100 is described. The air supply system 160 comprises an oxygen supply pipeline 161 that reaches the cathode of the fuel cell 100 via the compressor 150, the discharge pipeline 162 that discharges unconsumed air (cathode off-gas) to the atmosphere, and a discharge rate control valve 163 in the pipeline. The air supply system 160 includes a supply path whereby the air taken in from the open end of the oxygen supply pipeline 161 is supplied to the cathode of the fuel cell 100 after flow adjustment at the compressor 150 and a discharge route whereby the cathode off-gas is discharged to the atmosphere via the discharge pipeline 162 at a flow rate adjusted by the discharge rate control valve 163 in the discharge pipeline 162. The fuel cell system 10 is provided not only with the supply system described above but with a cooling system, not shown, that cools the fuel cell 100 by a circulated supply of cooling medium, which is not directly related to the subject matter of the present invention, and therefore the description thereof is omitted.

The secondary cell 170 is connected to the fuel cell 100 via the DC-DC converter 180 and functions as a power source different from the fuel cell 100. The secondary cell 170 not only supplies charged power to the driving motor 190 under the shutdown of the fuel cell 100 but also supplies power to various sensors such as a supply gas pressure sensor 131 via a buck converter, not shown. As the secondary cell 170, a lead rechargeable battery, a nickel-metal hydride battery or a lithium-ion battery, for example, may be adopted. The secondary cell 170 is connected to a capacity detection sensor 172, which detects the state of charge (SOC) of the secondary cell 170 and outputs the detected SOC to the control unit 200.

The DC-DC converter 180 has a function of controlling the charging and discharging of the secondary cell 170 upon receipt of control signals from the control unit 200 and adjusting the voltage level applied to the driving motor 190.

Figure 4:
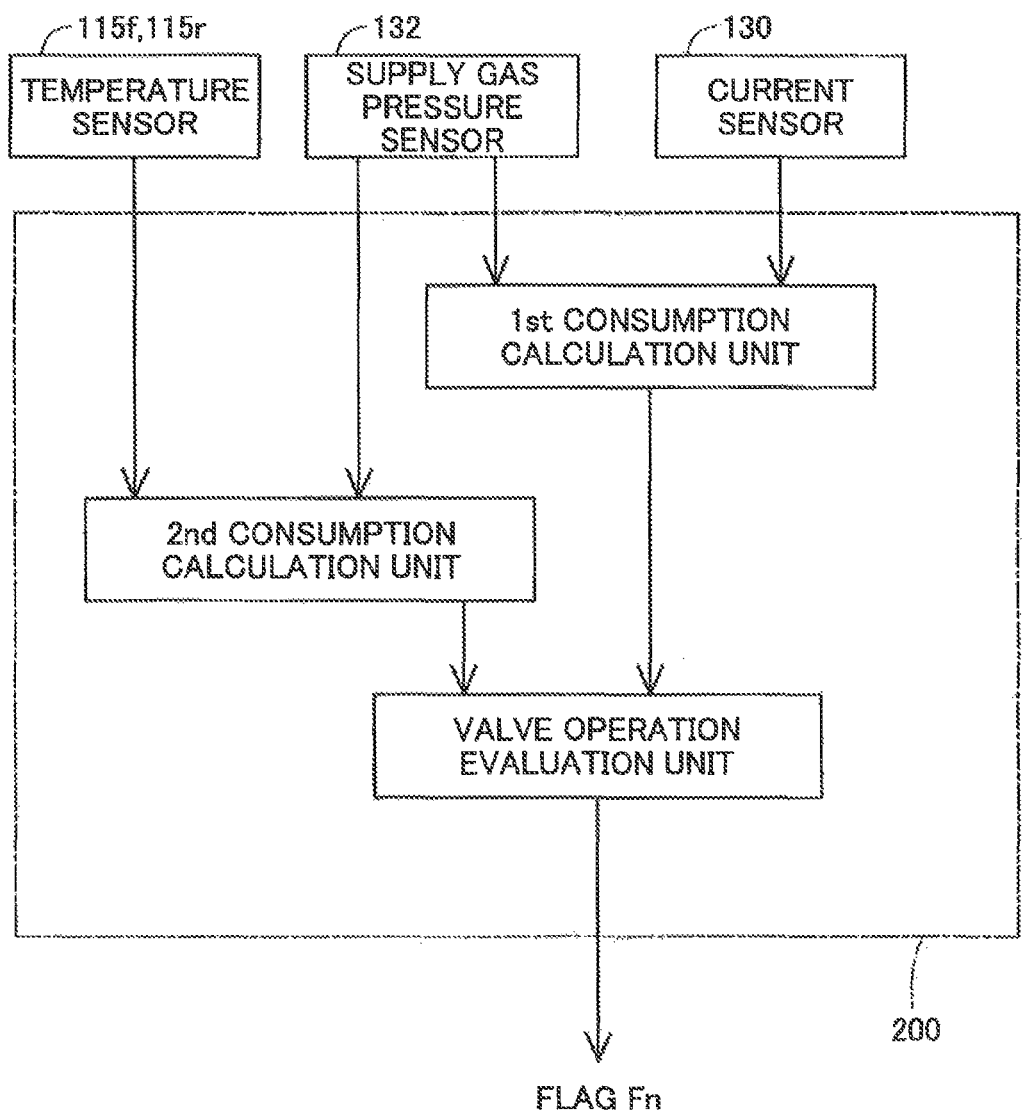
FIG. 4 is a block diagram of a control unit.

The control unit 200 is composed of so-called a microcomputer equipped with CPU, ROM, RAM and so forth that perform logical operations. The control unit 200 is in charge of various controls over the injector 125 and fuel cell 100 including the open-shut controls of the above-mentioned various valves upon receipt of signals from various sensors that detect the vehicle's driving status including the accelerator position sensor installed at the accelerator and signals from other sensors such as the supply gas pressure sensor 132 and temperature sensors 115f, 115r that detect the status of the hydrogen gas supply system 120. FIG. 4 illustrates a block diagram of the control unit 200. As shown in FIG. 4, the control unit 200 comprises a first consumption calculation unit inputting signals from the current sensor 130 and the supply gas pressure sensor 132, a second consumption calculation unit inputting signals from the supply gas pressure sensor 132 and the temperature sensor 115f & 115r, and valve operation evaluation unit inputting signals from the temperature sensor 115f & 115r. The control unit 200 output a value of a valve opening abnormality flag Fn described later.

Figure 2:
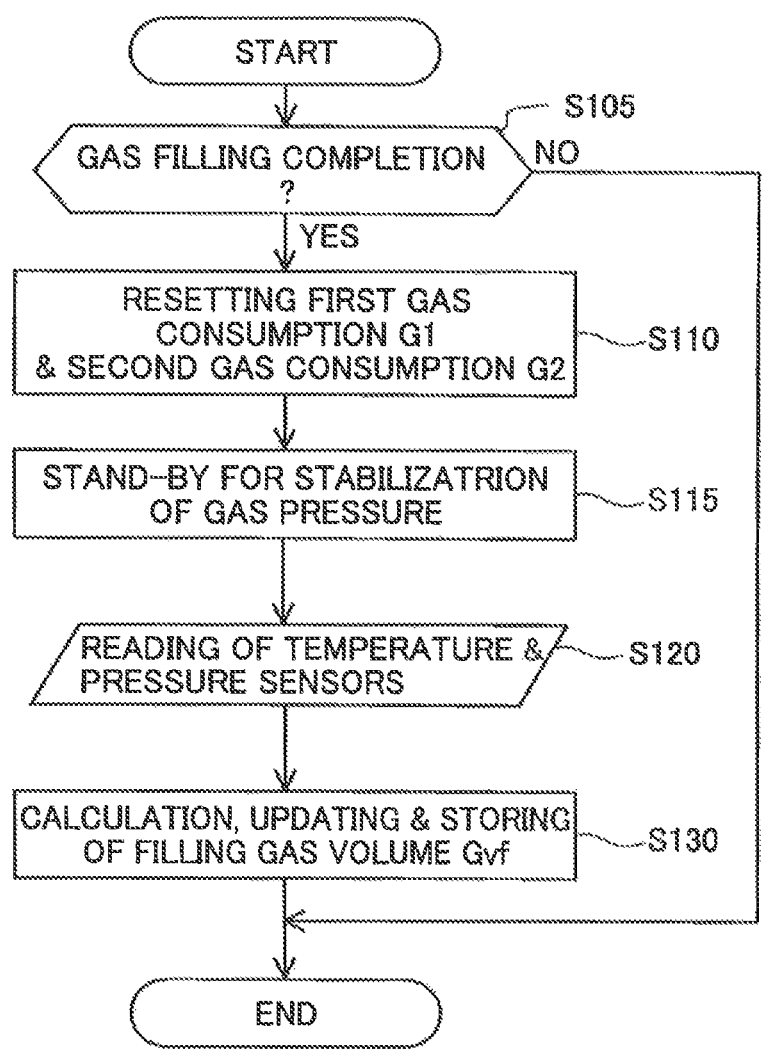
FIG. 2 is a flow chart showing gas filling and detection control.
Figure 3:
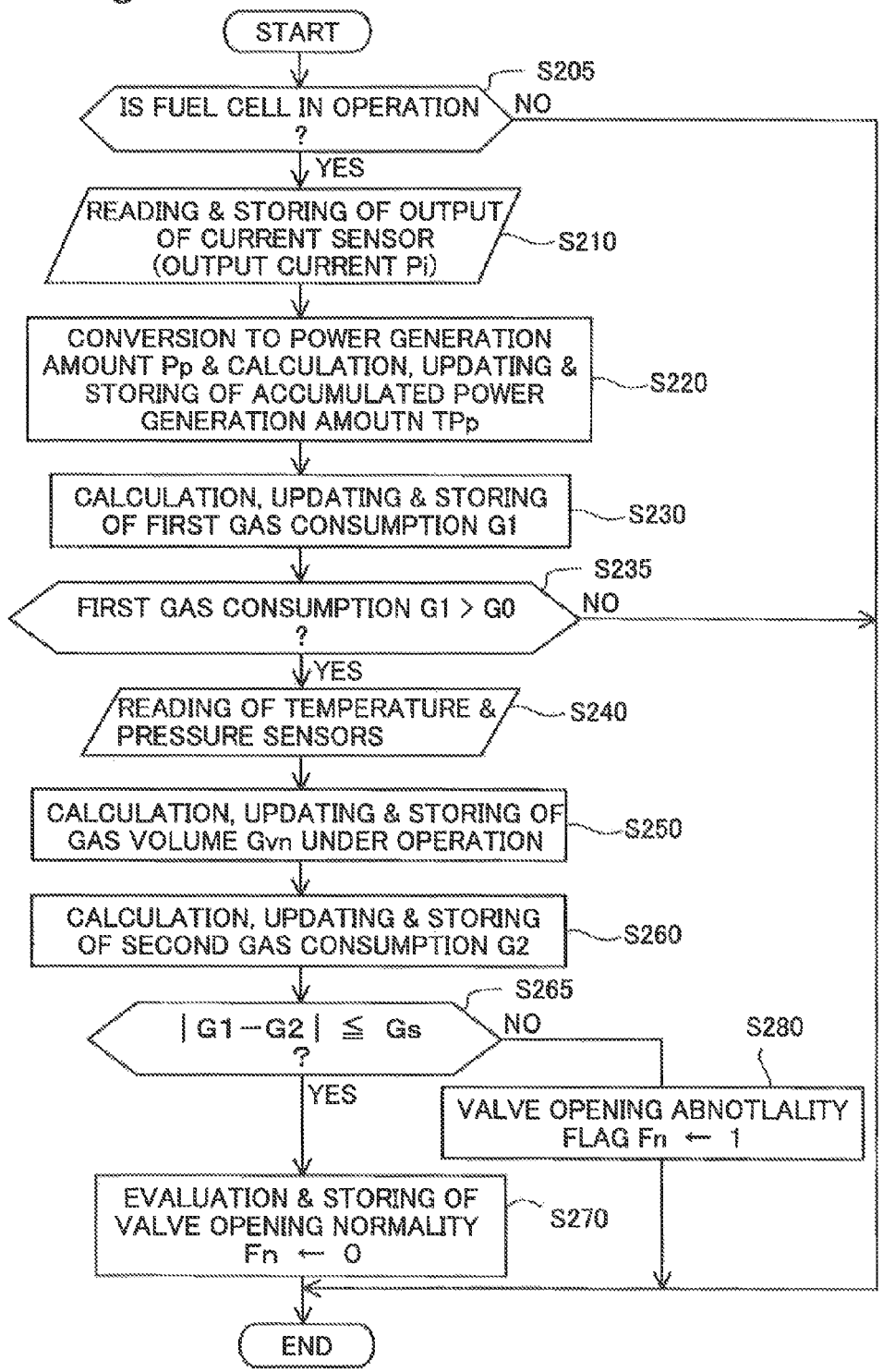
FIG. 3 is a flow chart showing an operation evaluation control of an on-off valve.

Next, various processes involved in the operation evaluation of the on-off valve 113 performed by the fuel cell system 10 of the present embodiment are described below. FIG. 2 is a flow chart showing the process of gas filling and detection, and FIG. 3 is a flow chart showing the process of operation evaluation control of the on-off valve. The gas filling and detection control of FIG. 2 takes place with an ignition switch of the fuel cell vehicle 20, not shown, turned off and is implemented from the time of detecting the installation of the gas filling nozzle Gn to the receptacle 122, that is, the time when the gas filling is started. Meanwhile, operation evaluation of the on-off valve shown in FIG. 3 is carried out repeatedly by the control unit 200 at given intervals.

In the process of gas filling and detection shown in FIG. 2, the control unit 200 first judges whether the gas filling is complete or not (Step S105). If a negative judgment is made, that is, the gas filling is judged to be incomplete, the present routine is ended for the time being without any further process. The evaluation judgment on the completion of gas filling is made based on the signal detected by the nozzle sensor 128 that indicates a connection between the receptacle 122 and gas filling nozzle Gn. As a matter of course, the evaluation judgment can be made based on the signal from a hydrogen gas station, not shown.

Once a judgment is made in Step S105 that the gas filling is complete, the control unit 200 resets the values of the first and second gas consumptions to zero so that they can be calculated and integrated in the process of operation evaluation of the on-off valve as described later (Step 3110). The reason for this reset of the gas consumption value is to use the filled-up situation of both hydrogen gas tanks 110f, 110r as a reference for calculating the gas consumption. The two hydrogen gas tanks 110f, 110r are connected in parallel to the fuel cell 100 and supplies fuel gas to the fuel cell 100 at the same time. Therefore, the pipeline from the hydrogen gas tanks 110f, 110r to the injector 125 via the supply-side manifold 121 is filled with hydrogen gas supplied from the two hydrogen gas tanks 110f, 110r. With the injector 125 in a closed state, the equation of the gas state is applicable in the space from the hydrogen gas tanks 110f, 110r to the injector 125, and with the tank volume V known including the two hydrogen gas tanks and pipelines, the remaining gas volume (mole) in the hydrogen gas tanks 110f, 110r can be determined by calculation if the pressure P of hydrogen gas detected by the supply gas pressure sensor 132 and the hydrogen gas temperature T detected by the temperature sensors 115f, 115r are known. The calculation is described later.

Upon resetting the gas consumption value in Step S110, the control unit 200 stands by for a given time until the gas pressure stabilizes (Step S115). In the process of filling gas, the gas pressure rises in the initial filling stage and stabilizes as the filling of the tank continues to bring the gas pressure of the tank to a certain level such as 70 Mpa. Since such gas behavior occurs within several hundreds of milliseconds after the completion of filling, the stand-by time is taken at least during that period in Step S115. After the stand-by in Step S115, the control unit 200 opens the on-off valves 113f, 113r and reads the sensor outputs of the temperature sensors 115f, 115r and the supply gas pressure sensor 132 (see FIG. 1) with the injector 125 in a closed state (Step S120), and calculates the amount of filled-up hydrogen gas Gvf from the equation of the gas state based on the read temperature T of the tank, the supply gas pressure P on the tank side detected by the supply gas pressure sensor 132, and the known tank volume V and updates and stores the data in a given memory area (Step S130). The filling and detection process of FIG. 2 ends with the updating and storing of the data on the amount of filled-up gas Gvf. Since the amount of filled-up gas Gvf as well as the first and second gas consumptions G1, G2 are calculated from the equation of the gas state based on the tank temperature T, the supply gas pressure P on the tank side detected by the supply gas pressure sensor 132, and the known tank volume V, each calculated value corresponds to the number of moles of hydrogen gas. In this embodiment, the timing doing the Step 130 is the point in time of the standard gas pressure, and the gas pressure at the point in time is the standard gas pressure. Usually the standard gas pressure is equal to the pressure when the hydrogen gas tanks 110f, 110r are filled up.

In the process of operation evaluation of the on-off valve of FIG. 3, the control unit 200 first judges whether the fuel cell 100 is in operation or not (Step S205), and if a negative judgment is made, the present routine is ended for the time being without any further process. The evaluation judgment on whether the fuel cell 100 is in operation or not is made based on the outputs of the ignition switch "ON" operation and the accelerator position sensor that detects the step-in of the accelerator and the like.

Following the positive judgment that the fuel cell is in operation in Step S205, the control unit 200 reads an output current Pi of the current sensor 130 and stores the data in the given memory area for later conversion to the amount of power generation (Step S210). In this case, the output current stored in the memory area turns out to be the output current Pi that was read this time in the process of operation evaluation of the on-off valve (FIG. 3) and the output current Pi that had been read and stored in the previous process. This way, the control unit 200 can monitor the status of power generation of the fuel cell 100, and as a result, can determine the change of the output current Pi during the time from the previously run operation evaluation of the on-off valve to the same operation this time (interval Δt). Following Step S210, the control unit 200 converts the value of this change in the output current Pi to the amount of power generation $P_p$ using the interval Δt, while adding the converted amount of power generation $P_p$ to the amount of power generation $P_p$ converted in the previously run operation evaluation of the on-off valve to calculate the accumulated amount of power generation $TP_p$ and update such data $TP_p$ stored in the given memory area (Step S220).

Next, the control unit 200 calculates the first gas consumption G1 in moles of hydrogen gas by checking the calculated accumulated amount of power generation $TP_p$ against a map, not shown, indicating a relation between the amount of power generation and hydrogen gas consumption to update and store the data in the given memory area (Step S230). The power is generated in the fuel cell 100 by oxidation reactions of hydrogen gas. Therefore, the amount of hydrogen consumption in the fuel cell 100 is basically in proportion to the amount of power generation, although it is affected by the generation efficiency. Since operation efficiency of the fuel cell 100 is roughly determined by the state of operation, it is easy to obtain a value of hydrogen gas consumption from the accumulated amount of power generation $TP_p$ if the data on relation between the accumulated amount of power generation $TP_p$ and the amount of hydrogen gas consumption are prepared for each state of operation. Operational status of the fuel cell 100 includes idling, normal running, warm-up, scavenging and catalyst recovery operations. Steps S220 to S230 in the operation evaluation of the on-off valve shown in FIG. 3 is carried out via the process of judgment that the fuel cell is in operation in Step 205 and repeated at given intervals in all steps of the fuel cell 100 including running, idling and warm-up operations of the fuel cell vehicle 20. Therefore, the control unit 200 monitors the status of power generation of the fuel cell 100 by reading the output current Pi with the current sensor 130 in Step S210, and calculates and integrates the first gas consumption G1 (mole), which is the hydrogen gas consumption since the completion of hydrogen gas filling in each of the hydrogen gas tanks 110f, 110r, based on the amount of power generated by the fuel cell 100.

Following the calculation of the first gas consumption G1, the control unit 200 compares this G1 with a predetermined threshold value G0 to evaluate whether the first gas consumption G1 exceeds the threshold value G0 (Step S235). In the present embodiment, the threshold value G0 was determined in the following manner:

Even if there is any opening failure of the on-off valve 113 in one of the hydrogen gas tanks 110f, 110r, hydrogen gas is supplied at a gas filling pressure JP from the other fuel gas tank 110 with no failure of the on-off valve 113 in the initial stage of gas supply from the filled-up hydrogen gas tank 110 to the fuel cell 100. The pressure change in case of having an opening failure of the on-off valve 113 in any of the hydrogen gas tanks 110f, 110r is different from that in case of having no such opening failure in either of them, but if the difference in pressure changes between the cases with and without an opening failure of the on-off valve is no more than a predetermined value, making judgments about any opening failure of the on-off valve is not realistic considering the detection precision of the sensor or drifting of gas and the like. The difference of pressure changes between the cases of having an opening failure and no failure becomes larger with the increasing gas consumption as the supply of hydrogen gas to the fuel cell 100 continues. Considering these circumstances, the amount of gas consumption until the difference of pressure changes between the cases of having an opening failure and no failure of the on-off valve 113 in any of the hydrogen gas tank 110 becomes large enough was defined by means such as experiments, and this value of the defined gas consumption was assumed to be G0.

In Step S235 described above, if a judgment is made that the first gas consumption G1 does not exceed the threshold value G0, the control unit 200 ends the present routine for the time being without any further process. Meanwhile, if a judgment is made that the first gas consumption G1 exceeds the threshold value G0, the control unit 200 reads the temperature and pressure of the hydrogen gas tank 110 in the current operating status of the fuel cell 100 from the temperature sensors 115f, 115r and the supply gas pressure sensor 132 shown in FIG. 1 (Step S240). Then, the control unit 200 calculates the amount of hydrogen gas in the tank in the current operating status of the fuel cell 100 (amount of gas Gvn under operation) from the equation of the gas state based on the read tank temperature T, the supply gas pressure P on the tank side, and the known tank volume V, and updates and stores the data in the given memory area (Step S250). The tank volume V used for calculation of the gas amount Gvn under operation is the tank volume V mentioned above including the hydrogen gas tanks 110f, 110r and the tank pipelines regardless of whether there is an operating failure of the on-off valve 113 or not.

Following the updated memory of the gas amount Gvn under operation, the control unit 200 reads the gas amount Gvf memorized in Step S130 and calculates the second gas consumption G2 by subtracting the gas amount Gvn under operation from the gas amount Gvf at the time of filling to update and store the data in the given memory area (Step S260). The process of Steps S240 to S260 in the operation evaluation control of the on-off valve shown in FIG. 3 is also implemented via the process of judgment in Step S205 that the fuel cell is in operation, which is repeated at given intervals in the process of idling of the fuel cell 100 while the vehicle is stopped and during the running process of the fuel cell vehicle 20. Therefore, the second gas consumption G2 calculated in each repeated process of Steps 240 to 260 turns out to be the amount of gas consumption during the time from the completion of filling hydrogen gas to each of the hydrogen gas tanks 110f, 110r to the present, which is the amount of gas consumption based on the pressure change from the gas filling pressure JP to the supply gas pressure on the tank side detected by the supply gas pressure sensor 132.

The control unit 200 reads the first gas consumption G1 that has been read in Step S230 and the second gas consumption G2 that has been read in Step S260 and compares the absolute value of the difference between these two gas consumptions with a threshold value Gs (Step S265). In the present embodiment, this threshold value Gs was defined as below.

Under the situation where an opening failure of the on-off valve 113 exists in either of the hydrogen gas tanks 110f, 110r, as the supply of hydrogen gas continues together with the operation of the fuel cell 100, the supply of gas from the hydrogen gas tank 110 without any opening failure of the on-off valve 113 (hereinafter briefly called "hydrogen gas tank 110Y with a normal on-off valve") is increased by the amount of stopped or decreased gas supply from the hydrogen gas tank 110 with an opening failure of the on-off valve 113 (hereinafter briefly called "hydrogen gas tank 110N with a valve opening failure") so that the remaining gas volume in the hydrogen gas tank 110Y with a normal on-off valve decreases. As a result, the tank gas pressure detected by the supply gas pressure sensor 132 decreases together with the remaining gas amount. For this reason, the supply gas pressure on the tank side detected by the supply gas pressure sensor 132 decreases depending on the gas pressure of the hydrogen gas tank 110Y with a normal on-off valve that now has low gas pressure because of no opening failure of the on-off valve 113, rapidly dropping from the gas filling pressure JP as compared to the case of no opening failure of the on-off valve 113 in any of the hydrogen gas tank 110. Then, as the supply of hydrogen gas continues together with the operation of the fuel cell 100, the second gas consumption G2 is calculated as a large value depending on the gas pressure in the tank. In other words, the second gas consumption G2 calculated from the pressure of the hydrogen gas on the tank side supplied front the hydrogen gas tank 110Y with a normal on-off valve to the fuel cell 100 and the tank temperature at that time (Step S260) gets larger due to the opening failure of the on-off valve 113 in one of the hydrogen gas tanks 110. Under these circumstances, in the fuel cell system 10 of the present embodiment, assuming that the first gas consumption G1 exceeds the threshold value G0, the conspicuous gas consumption differential between the first and second gas consumptions G1, G2 that can be inferred as caused by the opening failure of the on-off valve 113 in any of the hydrogen gas tank 110 is defined as a threshold value Gs. This threshold value Gs is defined also in consideration of the allowable range of leak in the course of the supply-side tank pipelines 116f, 116r and the fuel gas supply pipeline 120F.

Once the control unit 200 makes a positive judgment based on the comparison in Step S265 that the absolute value of the difference between the first gas consumption G1 and the second gas consumption G2 is limited within the threshold value Gs, it also judges that the opening operation of the on-off valve 113 is normal in any of the hydrogen gas tanks 110, that is, the hydrogen gas tanks 110f, 110r and stores the judgment result in the given memory area (Step S270). More specifically, the valve opening abnormality flag Fn, described later, is reset at zero. Thus, storing data indicating that the valve opening operation of the on-off valve 113 is normal is beneficial in referencing the history of valve operations and taking countermeasures during periodical inspections and the like. The control unit 200 resets the valve opening abnormality flag Fn in Step S270 to end the present routine if the on-off valve 113 operates normally in any of the hydrogen gas rank 110. Therefore, the valve opening abnormality flag Fn keeps the reset status thereafter until the valve opening abnormality flag Fn is set in Step S280, described later, in the subsequent routines. The factory shipment value of the valve opening abnormality flag Fn is zero.

In Step S265 described above, if a negative judgment is made that the absolute value of the difference between the first and second gas consumptions exceeds the threshold value Gs, the control unit 200 sets the value of the valve opening abnormality flag Fn that indicates an opening operation abnormality of the on-off valve 113 at 1 (Step S280). In response to this setting of valve opening abnormality flag fn, the control unit 200 performs lighting control of the abnormality warning lamp in the vehicular cabin in the process of controlling auxiliary machinery group, not shown, while storing the data indicating that there is an opening failure of the on-off valve 113 in one of the hydrogen gas tanks 110, that is, the hydrogen gas tanks 110f, 110r. This storing of data about normality or abnormality of valve opening operation is also beneficial in referencing the history of valve operations and taking countermeasures during periodical inspections and the like. The valve opening abnormality flag fn is reset after manual operation by a maintenance personnel, once the cause of the valve opening failure is removed and, for example, adjustments of valve components and valve replacement are undertaken.

As described above, the fuel cell system 10 of the present embodiment makes a judgment on whether there is any opening failure of the on-off valve 113 in one of the hydrogen gas tanks 110, either in the hydrogen gas tank 110*f* or the hydrogen gas tank 110*r* under an operational condition of the fuel cell 100 where filling of hydrogen gas is complete in any hydrogen gas tank 110 (Step S265). On that basis, in making a judgment on whether any valve opening failure is occurring or not, the system uses the first gas consumption G1 calculated and integrated based on the amount of power generated by the fuel cell 100 (Step S230) and the second gas consumption G2 based on the change in the gas pressure from the gas filling pressure JP at the completion of the filling to the current supply gas pressure on the tank side detected by the supply gas pressure sensor 132 while monitoring the status of power generation by the current sensor 130.

Since the first gas consumption G1 is the amount of gas consumption based on the amount of power generated by the fuel cell 100, it reflects the amount of hydrogen gas actually supplied to and consumed by the fuel 100 since hydrogen gas is supplied from both the hydrogen gas tank 110*f* and hydrogen gas tank 110*r* at the same time. Therefore, the first gas consumption G1 remains the same in case of a situation where hydrogen gas is supplied from both hydrogen gas tanks 110, that is, the hydrogen gas tanks 110*f*, 110*r*, and a situation where hydrogen gas is supplied only one of the hydrogen gas tanks 110.

On the contrary, the gas supply pressure that drops as the supply of hydrogen gas continues to the fuel cell 100 from the hydrogen gas tank 110 behaves differently depending on whether hydrogen gas is supplied from both hydrogen gas tanks 110, that is, the hydrogen gas tanks 110*f*, 110*r*, or it is supplied from only one of them. If hydrogen gas is supplied from both of the hydrogen gas tanks 110*f*, 110*r* at the same time, the supply gas pressure on the tank side detected by the supply gas pressure sensor 132 drops down as expected, and the second gas consumption G2 is determined based on the pressure drop (Step S260). Then, the second gas consumption G2 is no different from the first gas consumption G1 based on the amount of power generated by the fuel cell 100 if there is no opening failure of the on-off valve 113 in any of the hydrogen gas tank 110, whether the hydrogen gas tank 110*f* or the hydrogen gas tank 110*r*. Therefore, the second gas consumption G2 calculated and integrated based on the pressure change from the gas filling pressure JP turns out to be equal to the first gas consumption G1. Even if there is any difference between them, it is assumed to remain within the range of detection error allowed for the supply gas pressure sensor or the range of leak allowed in the flow path of the supply-side pipelines 116*f*, 116*r* and the fuel gas supply pipeline 120F.

However, if there is any opening failure of the on-off valve 113 in any hydrogen gas tank 110, whether it be the hydrogen gas tank 110*f* or 110*r*, the behavior of the supply gas pressure on the tank-side associated with the amount of hydrogen gas consumption in one of the hydrogen gas tanks 110 turns out different from the normal one. As a matter of course as described above, in the initial stage of gas supply when hydrogen gas supply from the hydrogen gas tank 110 to the fuel cell 100 is started, since hydrogen gas is supplied at the gas filling pressure JP from the hydrogen gas tank 110Y with a normal on-off valve, it can be considered that the difference between the pressure change in case of having an opening failure of the valve 113 in any fuel gas rank 110 and the pressure change in case of having no such failure in the same fails within the range of detection error of the sensor and the like or drifting of gas.

Considering these circumstances, the fuel cell system 10 of the present embodiment does not make any judgment on whether or not there is an opening failure of the on-off valve 113 (Steps S240 to 280) using the absolute value of the gas consumption difference between the first gas consumption G1 and second gas consumption G2 if the first gas consumption G1 has not reached the predetermined threshold value G0 (negative judgment in Step (S235). As a result, an error of misjudgment that there is no valve opening failure of the on-off valve 113 despite the existence of such failure in any hydrogen gas tank 110 can be avoided, thereby preventing deterioration of judgment reliability in a highly effective manner.

The fuel cell system 10 of the present embodiment makes a judgment on any opening failure of the on-off valve 113 using the absolute value of the difference between the first gas consumption G1 and second gas consumption G2 in the following manner: If there is any opening failure of the on-off valve 113 in one of the hydrogen gas tanks 110, as the supply of hydrogen gas from the hydrogen gas tank 110Y with a normal valve proceeds, the supply gas pressure on the tank side detected by the supply gas pressure sensor 132 drops early from the standard gas pressure by the amount of stopped or decreased gas supply from the hydrogen gas tank 110N with a valve opening failure as compared to the case where there is no opening failure of the on-off valve 113, and such pressure change is totally different from the pressure change in case of having no such opening failure of the on-off valve 113. For that reason, if there is any opening failure of the on-off valve 113 in one of the hydrogen gas tanks 110, the second gas consumption G2 based on the pressure change differs from the first gas consumption G1. As a result, using the fuel cell system of the above aspect, one can prevent the deterioration of reliability in making a judgment of no opening failure of the on-off valve when the gas consumption differential between the first and second gas consumptions is limited within the predetermined threshold. Since the fuel cell system of the aspect described above allows such a judgment that there is an opening failure of the on-off valve in one of the fuel gas tanks if the gas consumption differential between the first and second gas consumptions is not limited within the predetermined threshold, deterioration of reliability can be prevented also for the judgment on whether there is such valve opening failure. The judgment in Step S265 is made based on an absolute value of the difference between the first and second gas consumptions, but the judgment may be made with a signed value instead of the absolute value. For example, if the threshold value Gs is positive and G2−G1>Gs is true, it may be judged that there is a valve opening abnormality in any of the on-off valves 113*f* and 113*r*, and if G1−G2>Gs is true, it may be judged chat there is an abnormality in any of the supply gas pressure sensor 132, the temperature sensors 115*f*, 115*r* or else. This is because, in case of valve opening failure of on-off valves 113*f*, 113*r*, the second gas consumption G2 usually never turns out to be smaller than the first gas consumption G1 by calculation. The threshold value Gs in such a case may be considered to vary in each case.

The fuel cell system 10 of the present embodiment calculates the first gas consumption G1 and second gas consumption G2 from the time of completion of gas filling when each hydrogen gas tank 110 is filled with hydrogen gas and uses the gas filling pressure JP at the completion of filling as a basis for calculating the amount of consumption.

Therefore, using the fuel cell system 10 of the present embodiment, judgments that there is any or no opening failure of on-off valve 113 can be made with high reliability from the time of filling when each hydrogen gas tank 110 is filled with gas up to the gas filling pressure JP. In other words, the normality or abnormality of valve opening operation of the on-off valve 113 can be determined with high reliability at each completion of gas filling, which is indispensable for running a vehicle.

The fuel cell system 10 of the present embodiment is provided with two of the hydrogen gas tanks 110, that is, the hydrogen gas tanks 110f and 110r, but none of the tank mouthpieces 111f, 111r thereof require a pressure sensor that detects the gas supply pressure on the tank side. Therefore, using the fuel cell system 10 of the present embodiment, the equipment configuration can be simplified.

Since the fuel cell vehicle 20 of the present embodiment is equipped with a fuel cell system 10 provided with the fuel cell 100 described above, the normality or abnormality of valve opening operation of the on-off valve 113 can be determined with high reliability during running of the vehicle with the power generated by the fuel cell 100.

The present invention is not limited to the embodiment described above and can be implemented in various configurations within the range not to deviate from the spirit of the invention. For example, in the above embodiment, judgment on normality or abnormality of the on-off valve was made by software of the control unit 200, but it is also possible to carry out at least part of the processes shown in FIGS. 2 and 3 by hardware. Also, the temperature of hydrogen gas may be measured not by the sensor installed in the hydrogen gas tanks 110f, 110r but by other methods. For example, the temperature may be inferred from the viscosity of hydrogen gas flowing in the pipeline. The technical characteristics of the embodiment corresponding to the technical characteristics in each aspect described in the Disclosure of the Invention can be properly replaced or combined with others in order to solve all or part of the above problem or achieve all or part of the above effect. Also, if those technical characteristics are not described as essential, they can be deleted as appropriate.

For example, in the embodiment described above, the two hydrogen gas tanks were mounted on the vehicle in the front-rear direction, but the vehicle can take a configuration of three or more hydrogen gas tanks on board. Further, the tanks can be mounted not only in the front-rear direction but also in the left-right direction of the vehicle.

In the embodiment described above, the first gas consumption G1 and the second gas consumption G2 were calculated using the gas filling pressure JP from the time of the completion of filling, but the method is not limited to it. For example, once the gas supply pressure on the tank side detected by the supply gas pressure sensor 132 is reduced to a predetermined gas pressure lower than the gas filling pressure JP, and from that time on, calculation of the first gas consumption G1 based on the amount of power generated by the fuel cell 100 obtained from the current sensor 130, calculation of the second gas consumption G2 based on the change of pressure on the tank-side detected by the supply gas pressure sensor 132, and evaluation of the valve operation based on the later gas consumption differential can ail be performed. Also, the first gas consumption G1 and the second gas consumption G2 may be compared directly without determining the differential between G1 and G2. This is because the widening difference between the two amounts of consumption can well be defected by the direct comparison as the consumption of hydrogen gas continues under a situation where one of the on-off valves 113f, 113r fails to open.

In the embodiment described above, once the first gas consumption G1 exceeds the threshold value G0, calculation of the second gas consumption G2 and the valve operation evaluation based on the later gas consumption differential are performed, but the method is not limited to it. For example, the process of Step S240 to S260 involved in the calculation of the second gas consumption G2 may be undertaken following the positive evaluation in Step S205, and the second gas consumption G2 is compared with the threshold value G0. Thereafter, the process of Steps S210 to S230 involved in the calculation of the first gas consumption G1 may be undertaken according to the comparison result. The above effect can be achieved this way.

In the above embodiments, the control unit 200 calculates the total amount of the gas consumption and evaluates the valve abnormality by the steps or programs. The control unit 200 may be configured to use circuitry that materializes the calculations and evaluations in whole or part.

What is claimed is:

1. A fuel cell system comprising:
a fuel cell that generates power by receiving fuel gas;
a plurality of fuel gas tanks connected in parallel to the fuel cell;
an on-off valve provided in a fuel gas flow path from each of the fuel gas tanks, wherein the on-off valve is electrically driven and switched between two positions to discharge fuel gas from a respective one of the plurality of gas fuel tanks to the fuel cell and shut fuel gas off;
a supply gas pressure sensor that detects supply gas pressure in sight of the plurality of fuel gas tanks when fuel gas from the plurality of fuel gas tanks is simultaneously supplied to the fuel cell; and
an electric circuitry comprising:
a first consumption calculation unit that monitors a power generation status of the fuel cell and calculates a total amount of a fuel gas consumption from a point in time when the supply gas pressure detected by the supply gas pressure sensor reaches a standard gas pressure predetermined, based on an amount of power generated by the fuel cell;
a second consumption calculation unit that calculates a total amount of a fuel gas consumption based on a gas pressure change that corresponds to a decrease of the gas pressure detected by the supply gas pressure sensor from the standard gas pressure; and
a valve operation evaluation unit that evaluates whether the on-off valve fails to be opened by comparing total amounts of the fuel gas consumptions calculated by the first and second consumption calculation units with each other.

2. The fuel cell system in accordance with claim 1, wherein the valve operation evaluation unit determines a gas consumption differential, which is an absolute value of a difference between the total amounts of the fuel gas consumptions calculated by the first and second consumption calculation units respectively, and in case where the gas consumption differential is less than a predetermined threshold value, the valve operation evaluation unit evaluates that the on-off valve does not fail to be opened.

3. The fuel cell system in accordance with claim 1, wherein the point in time of the standard gas pressure predetermined is when each of the plurality of the fuel gas tanks has been filled up, and the standard gas pressure predetermined is a gas pressure when the plurality of fuel gas tanks has been filled up.

4. The fuel cell system in accordance with claim 1, wherein the valve operation evaluation unit does not evaluate whether the on-off valve fails to be opened by comparing the total amounts of the fuel gas consumptions, under a situation where at least one of the total amounts of the fuel gas consumptions calculated by the first and second consumption calculation units has not reached a predetermined gas consumption amount.

5. A vehicle comprises:
   a fuel cell system in accordance with claim 1; and
   battery that is charged by electric power generated in the fuel cell.

6. A vehicle comprises:
   a fuel cell system in accordance with claim 2; and
   battery that is charged by electric power generated in the fuel cell.

7. A vehicle comprises:
   a fuel cell system in accordance with claim 3; and
   battery that is charged by electric power generated in the fuel cell.

8. A vehicle comprises:
   a fuel cell system in accordance with claim 4; and
   battery that is charged by electric power generated in the fuel cell.

9. A method for evaluating an operation failure of an on-off valve provided in a fuel gas flow path from a plurality of fuel gas tanks to a fuel cell in a fuel cell system, the method comprises:

detecting a supply gas pressure of fuel gas that is simultaneously supplied to the fuel cell from the plurality of fuel gas tanks connected in parallel to the fuel cell;
   monitoring a power generation status of the fuel cell and calculating a first total gas consumption from a point in time when the detected supply gas pressure reaches a standard gas pressure predetermined, based on an amount of power generated by the fuel cell;
   calculating a second total gas consumption based on a gas pressure change that corresponds to a decrease of the detected supply gas pressure from the standard gas pressure; and
   evaluating whether the on-off valve fails to be opened by comparing the first and second total gas consumptions.

10. The method in accordance with claim 9, wherein the evaluating the on-off valve failure comprises calculating a gas consumption differential, which is an absolute value of a difference between the first and second total gas consumptions, and determining that the on-off valve does not fail to be opened in case where the gas consumption differential is less than a predetermined threshold value.

11. The method in accordance with claim 9, wherein the point in time of the standard gas pressure predetermined is when each of the plurality of the fuel gas tanks has been filled up, and the standard gas pressure predetermined is a gas pressure when the plurality of fuel gas tanks has been filled up.

12. The method in accordance with claim 9, wherein the evaluation whether the on-off valve fails to be opened is not activated, under a situation where at least one between the first and second total gas consumptions calculated has not reached a predetermined gas consumption amount.

* * * * *